United States Patent
Schaeff

(10) Patent No.: US 6,293,579 B1
(45) Date of Patent: Sep. 25, 2001

(54) MOBILE RIG ON WHEELS WITH TRANSVERSE MOTION

(75) Inventor: Hans Schaeff, Langenburg (DE)

(73) Assignee: Karl Schaeff GmbH & Co Maschinenfabrik, Langenburg (DE)

( * ) Notice: Subject to any disclaimer, the term of this patent is extended or adjusted under 35 U.S.C. 154(b) by 0 days.

(21) Appl. No.: 09/263,825

(22) Filed: Mar. 8, 1999

(51) Int. Cl.$^7$ .............................. B60G 9/02; B62D 61/00
(52) U.S. Cl. ............. 280/638; 280/124.11; 280/124.114; 280/124.117; 280/124.122; 180/209
(58) Field of Search .................. 280/124.11, 124.111, 280/124.117, 124.114, 124.121, 124.112, 124.122, 124.113, 124.123, 638; 180/209, 24.02

(56) References Cited

U.S. PATENT DOCUMENTS

| | | | |
|---|---|---|---|
| 3,411,804 | * | 11/1968 | Hill et al. . |
| 3,439,927 | * | 4/1969 | Ryskamp . |
| 3,466,058 | * | 9/1969 | King . |
| 3,768,672 | * | 10/1973 | Grooss ........................... 280/124.11 |
| 3,777,919 | * | 12/1973 | Konijn ........................... 280/124.11 |
| 3,820,615 | * | 6/1974 | Bobard ........................... 280/124.11 |
| 3,856,149 | * | 12/1974 | Shaw ............................... 280/124.11 |
| 3,899,037 | * | 8/1975 | Yuker .............................. 280/124.11 |
| 3,994,083 | * | 11/1976 | Cunningham ................... 280/124.11 |
| 4,039,094 | | 8/1977 | Grove . |
| 4,082,197 | | 4/1978 | Stedman . |
| 4,135,597 | | 1/1979 | Barth . |
| 4,433,857 | * | 2/1984 | Zwale .............................. 280/124.11 |
| 4,483,552 | * | 11/1984 | Dorscht .......................... 280/124.11 |
| 4,923,361 | | 5/1990 | Adolfsson . |
| 5,368,121 | * | 11/1994 | Priefert .......................... 280/124.11 |
| 5,489,114 | * | 2/1996 | Ward et al. ..................... 280/124.11 |
| 5,961,135 | * | 10/1999 | Smock ............................ 280/124.11 |

FOREIGN PATENT DOCUMENTS

| | | |
|---|---|---|
| 23 60 825C2 | 6/1975 | (DE) . |
| 0 228 208 | 7/1987 | (EP) . |
| 0 701 963 A1 | 3/1996 | (EP) . |
| 2 573 278 | 5/1986 | (FR) . |
| 2047306 | * 11/1980 | (GB) ............................. 280/124.111 |
| 2 121 363 A | 12/1983 | (GB) . |

OTHER PUBLICATIONS

European Search Report dated Apr. 16, 1998, (2 pages).

* cited by examiner

Primary Examiner—Peter C. English
Assistant Examiner—Toan To
(74) Attorney, Agent, or Firm—Shlesinger Arkwright & Garvey, LLP

(57) ABSTRACT

A mobile rig on wheels with transverse motion, in particular a telescoping stacker, having a first axle mounted on a rigid vehicle frame and a second axle disposed transversely movably on the vehicle frame to describe a circular translation. Advantageously, the second axle is disposed on the vehicle frame by parallel links and the parallel links can be swivelled through vertical axes by swivel actuation device.

20 Claims, 4 Drawing Sheets

MOBILE RIG ON WHEELS WITH TRANSVERSE MOTION

FIELD OF THE INVENTION

The invention relates to a mobile rig on wheels with transverse motion having a first axle mounted on a rigid vehicle frame. Such rigs are, for example, telescoping stackers with a telescopically extendable and upwardly swivellable mast on which a normally affixed stacker fork can be replaced by other tools such as light-material buckets, crane hooks, clamps, etc.

BACKGROUND OF THE INVENTION

Telescoping stackers are used to pick up a load and to convey it to another place with the aid of the complex wheel-type chassis. On the other hand, these rigs work more or less in a stationary manner when the considerable reach and height of their telescoping arm is utilised, for example, to convey some material to be loaded to a construction site to a height of 10 meters and to set it down there at an exactly determined place. In these cases, the rig must be stabilised and, on uneven ground, be horizontalised laterally to the vehicle's longitudinal axis so that the steeply adjustable telescopic mast, including its load, remains roughly in the perpendicular plane enclosing the vehicle's longitudinal axis. Although a person operating the rig quickly develops practice in travelling precisely to the loading or unloading target and in performing the required stabilisation, there remains the more difficult task of moving a load laterally by about 0.5 m at the substantial distance given when the telescopic mast is extended in order, for example, to travel it into a laterally restricted aperture in a building.

To perform this transverse motion of the load, it is known to provide as the fork carrier a hydraulically activated transverse slide whose rails are affixed to the telescopic mast end. Due to the weight of transverse slides, rails and drive means, however, the working load is reduced, which makes itself felt disadvantageously in a restrictive manner above all with telescope lifts of up to 10 meters.

To swivel a heavy load transporting vehicle laterally in place under confined conditions without moving backwards or forwards, a stabilising device which can be lowered from the end of the vehicle frame is known from DE 23 60 825 C2, which stabilising device possesses fixed perpendicular hydraulic jacks on the vehicle frame and a beam resting on the travel formation and curved in accordance with the intended swivel radius. As the top section of the beam divided in the longitudinal direction, which top section is connected rigidly to the hydraulic jacks, is supported movably on the lower section and as both beam sections can be moved relatively to each other by a motor, the vehicle can be swivelled laterally in an angle roughly given by the beam length at its end raised by the stabilising device.

From U.S. Pat. No. 4,923,361 a device for sidewards motion for a fork-lift is known whose vehicle frame is stabilised by means of a rear steering wheel pair and by means of two front wheels supported on rigid-mounted axles. On the bottom side of two fork tines extending forwards to over the front wheels there are disposed supporting legs swivellable around axes running in the direction of the tines whose free end supports a base supported in an articulated manner. With a raised stacker fork, in order to effect a sidewards motion, a supporting leg is pivoted down from each fork tine by pedal actuation into a final position determined by a stop in which final position its direction of extension forms an acute angle with the perpendicular. If due to a motorised lowering of the stacker fork the slanted supporting legs come into contact with the floor with their bases, the front wheels thus relieved in part lose their floor contact and perform a limited sidewards motion together with the front end of the vehicle frame until, as the slant of the supporting legs moving in the direction of their horizontal position of rest in the folded-up position increases, the friction connection of the bases with the floor ends. To perform sidewards motions in opposite directions, there are disposed on both fork tines two supporting legs each which can be slanted in opposite directions of which depending on the intended motion direction one supporting leg is folded down by pedal actuation.

On this basis, the object of the invention is to provide a mobile rig on wheels with transverse motion of the type given above with a simplified device for the transverse motion of the rig.

OBJECTS AND SUMMARY OF THE INVENTION

To solve this object, a mobile rig on wheels with transverse motion is proposed. Accordingly, in accordance with the invention, the second axle of the rig is disposed in a transversely movable manner on the vehicle frame in such a way that it can perform a circular translation seen in reference to the vehicle frame. By means of this measure, the transverse motion capability of the rig is ensured without any additional stabilising devices to raise the front axle. In normal operation of the rig, both axles of the rig are aligned centrally to each other with respect to the vehicle's longitudinal axis given by the rigid vehicle frame. If necessary, a lateral motion of the movably disposed second axle is effected along a circular translation orbit, i.e. the two axles of the rig are always aligned in parallel to each other; however, the central point of the movably disposed axle is transposed with regard to the vehicle's central axis and the distance between the two axles is reduced. As, however, during the transverse motion of the movably disposed second axle the rig stands solidly on the floor with all wheels affixed to the axles, a transverse motion of the rig through a small angle of up to 5° is associated with the transverse motion of the movably disposed second axle. In accordance with the invention, for the transverse motion of the rig thus no additional stabilising devices are required any longer to raise the front axle and move the vehicle. Rather, the function of the stabilising device is taken over in accordance with the invention by the transversely movably disposed second axle. One substantial advantage of the proposed rig can be found in that the lateral motion can no longer only be effected with a raised axle (and thus a fixed rig), but is now also possible in the rolling state of the rig.

In an aspect of the invention, the second axle is disposed on the vehicle frame by means of parallel links. Advantageously, the parallel links can be swivelled around vertical axes by means of an associated swivel actuation means.

In another aspect of the invention, the parallel links linked on the one end to the vehicle frame are linked on the other end to an axle support in which the second axle is disposed in a rigidly screwed manner. This aspect in accordance with the invention ensures a particularly stable disposition of the second axle to the right vehicle frame.

In yet another aspect of the invention, the parallel links linked on the one end to the vehicle frame are linked on the other end to an axle support in which the second axle is pivoted centrally and around a longitudinal axis of the rig.

By means of this design of the rig in accordance with the invention, the second axle can be adjusted in a known manner for a transverse inclination compensation of the rig. Advantageously, the rotational actuation of the second axle for the transverse inclination compensation is effected by means of a hydraulic cylinder.

BRIEF DESCRIPTION OF THE DRAWINGS

The invention is represented schematically by means of embodiments in the drawing and is described in detail below with reference to the drawing.

DETAILED DESCRIPTION OF THE PREFERRED EMBODIMENT

Figure 1:
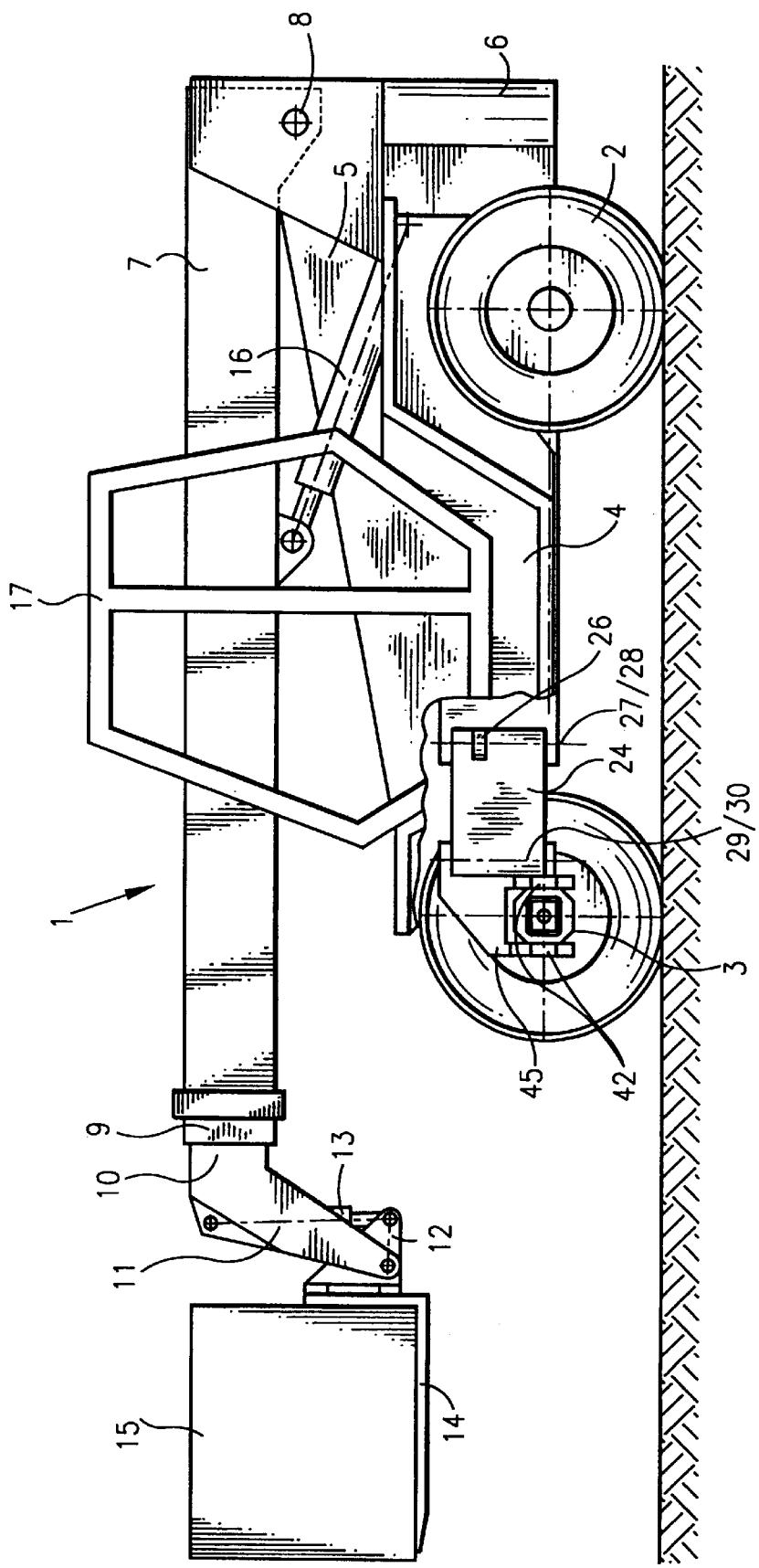
FIG. 1 shows as a first embodiment of a rig in accordance with the invention a telescoping stacker with load taken up in a side view with a transversely movable and centrally pivoted front axle.

FIG. 1 shows as the rig 1 in accordance with the invention a mobile telescoping stacker on wheels having a rigid vehicle frame 4. There is mounted as the first axle 2 on the vehicle frame 4 a rear axle 2 mounted in an oscillating manner (axle oscillation bearing 18) and as the second axle 3 a front axle 3 disposed transversely movably to describe a circular translation. The exact functioning of the front axle 3 disposed in accordance with the invention is explained in detail below with respect to the FIGS. 2 and 3.

The telescoping stacker further possesses a vehicle superstructure 5 supported by the vehicle frame 4, associated with which superstructure is a rear counterweight 6 and a telescoping arm 7. The telescoping arm 7 possesses a horizontal bearing axle 8 on the vehicle superstructure and has a first slide 9 and optionally a second slide 10 and a slide lug 11. Provided on the slide lug 11 is a tiltable tool carrier 12 actuatable by means of a rocker cylinder 13 having a replaceable tool, in this case a stacker fork 14, with a load 15 having been taken up being indicated on the stacker fork 14. The telescoping arm 7 extendable to around 10 meters extends next to an operator's cabin 17 and can be adjusted vertically by one or two arm cylinders 16 to a very steep course of a maximum of around 70°.

Figure 2:
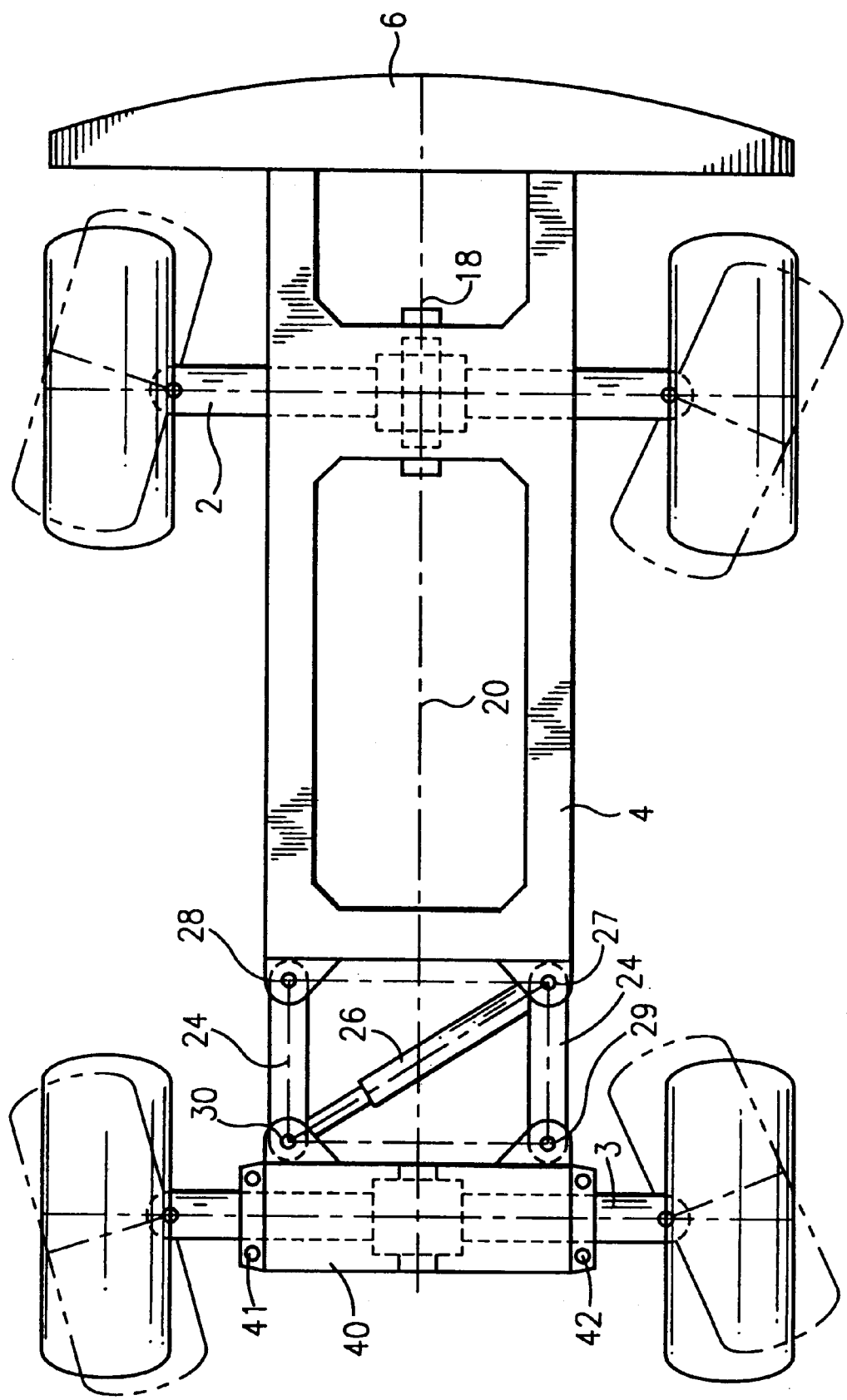
FIG. 2 shows a top view of the chassis of a second embodiment of a rig in accordance with the invention with a laterally movable front axle screwed in a rigid manner in is base position.
Figure 3:
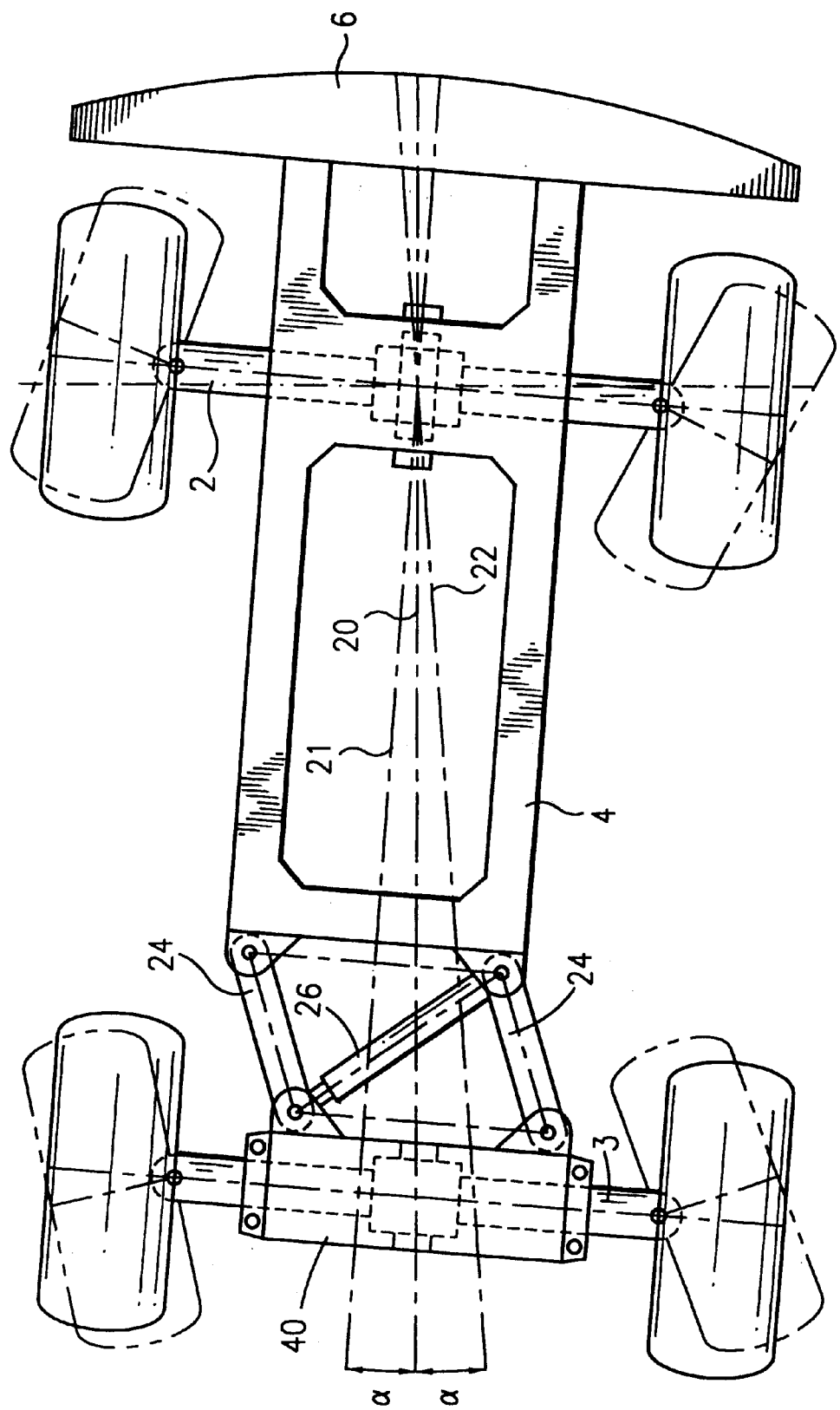
FIG. 3 shows the chassis of FIG. 2 in a top view with a laterally swivelled vehicle frame; and, FIG. 4 shows a front view of the chassis of the telescoping stacker of FIG. 1 on a sloped floor.

As can be seen from the top view of FIGS. 2 and 3, the transversely movable linking of the front axle 3 to the vehicle frame 4 is performed by means of parallel links 24, which in the embodiments shown are linked on the one end by vertical bolts 27, 28 to the vehicle frame 4 and on the other end by means of vertical bolts 29, 30 to an axle support 40, 45 accepting the front axle 3 and form in their base position the extension of the outside panel of the vehicle frame 4.

Figure 4:
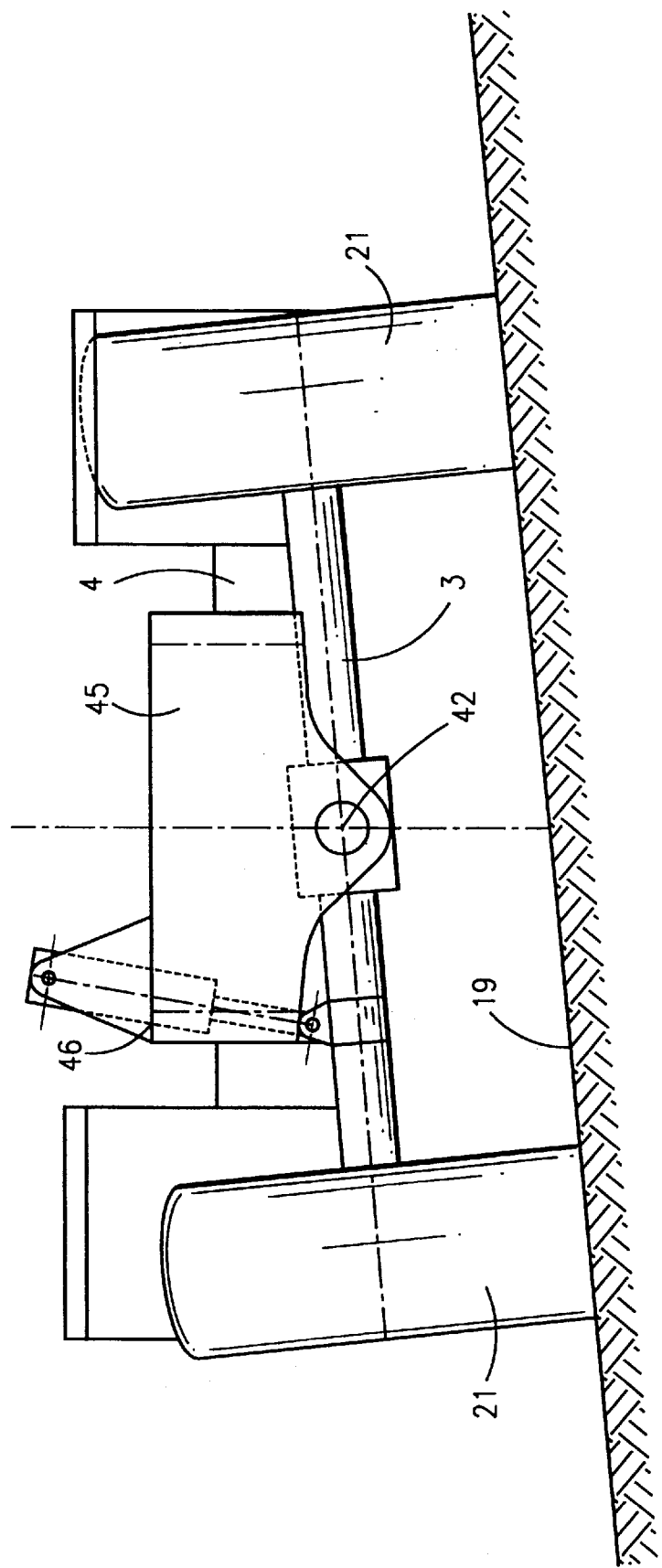

In the embodiment shown in FIGS. 2 and 3, the front axle 3 is screwed rigidly in the axle support 40 by means of screws 41, while in the embodiment of FIGS. 1 and 4 the front axle 3 is pivoted centrally in the axle support 45 and around a longitudinal axis of the rig 1.

For the actuation of the parallel links 24 and thus for the transverse motion of the rig 1, there is provided as the swivel actuation means 26 a hydraulic adjusting cylinder 26 which runs diagonally in the rectangle given by the parallel links 24, the vehicle frame 4 and the front axle 3 and is linked to the bolts 27, 30. The disposition of the adjusting cylinder 26 is, however, not limited to the diagonal link shown, but other dispositions are also possible.

When the adjusting cylinder 26 is actuated in the sense of a shortening, as is shown in FIGS. 2 and 3, there is effected by a swivel of the parallel links 24 a transverse motion of the front axle 3 in the sense of a circular translation to the left in the direction of view of the operator. Accordingly, with an actuation of the adjusting cylinder 26 in the sense of an extension, a transverse motion of the front axle 3 to the right in the direction of view of the operator is associated.

As the rig 1 stands rigidly on the floor with the wheels 20 of the back axle and the wheels 21 of the front axle 3, the transverse motion of the front axle 3 effects a swivel of the vehicle frame 4 with respect to the contact points of the wheels 20, 21. The swivel of the vehicle frame 4 is effected in this process through an angle α which corresponds to up to around 5° in the embodiment shown. The angle α is—as can be seen from FIG. 3—measured between the vehicle's longitudinal central axle 20 of the base position of the rig 1 (see FIG. 2) and the vehicle's longitudinal central axle 21 of the rig 1 in the swivelled state (see FIG. 3). While in the base position of the rig 1, the vehicle longitudinal central axle 20 runs through the center of the back axle 2 and the center of the front axle 3, the vehicle's longitudinal central axle 21 is situated due to the transverse motion of the front axle 3 next to the center of the front axle 3; however, it continues to run perpendicular to the front axle 3, as the transverse motion of the front axle 3 is, in accordance with the invention, a circular translation, i.e. a parallel motion, in which a given point of the front axle 3 describes a circular orbit, whose center is situated on a straight line connecting the points of linkage 27, 28 of the parallel links 24 to the vehicle frame 4.

FIG. 3 shows in addition to the vehicle's longitudinal central axle 21 given by the drawn swivel of the vehicle frame 4 also a vehicle's longitudinal central axle 22, which corresponds to α swivel of the vehicle frame 4 through the angle a in the opposite direction by an extension of the adjusting cylinder 26 from the base position of FIG. 2.

As indicated in FIG. 3, the wheels roll slightly on the floor due to the swivel of the vehicle frame.

In the embodiment shown in FIGS. 1 and 4, the front axle 3 is pivoted centrally in the axle support 45 and around a longitudinal axis of the rig 1, i.e. disposed in an oscillating manner. For this purpose, the axle support 45 accepts the front axle 3 by means of journal pins 42. By means of a hydraulic cylinder 46 linked between the axle support 45 and the front axle 3, a transverse inclination compensation of the front axle 3 known per se can thus be effected, when the rig 1 stands on a floor 19 inclined against the perpendicular.

The invention is not limited to the use in a telescoping stacker, but is also suited for use in other rigs. Depending on the application, the swivel angle α can be selected to be larger than 5°. This can be effected, for example, by a coordination of the length of the stroke path of the adjusting cylinder in respect to the length of the parallel links, as with longer parallel links the same swivel angles can already be reached with smaller movements. The use of longer parallel links works advantageously insofar as larger swivel angles can be reached with low lateral forces acting on the vehicle frame.

I claim:

1. A mobile rig comprising:
a) a rigid vehicle frame having a longitudinal axis;
b) a telescoping stacker operably mounted to said frame;
c) a first axle mounted on said vehicle frame, said first axle supporting a first pair of wheels; and,
d) a second axle mounted on said vehicle frame a distance from said first axle, said second axle supporting a second pair of wheels, said second axle movable laterally and longitudinally relative to said vehicle frame to provide parallel displacement of said second axle relative to said first axle wherein the distance between said first axle and said second axle is selectively varied.

2. A mobile rig as in claim 1 and further including:
a) parallel links, said parallel links operatively associated with said second axle and said vehicle frame for mounting said second axle to said vehicle frame.

3. A mobile rig as in claim 2 and further including:
a) swivel actuator, said swivel actuator operatively associated with said parallel links for providing swiveling therethrough about a vertical axis.

4. A mobile rig as in claim 3 and wherein:
a) said swivel actuator is a hydraulic cylinder.

5. A mobile rig as in claim 2 and wherein:
a) said parallel links having at least a first end and an opposite second end, said parallel links linked by one of said at least a first end and an opposite second end to said vehicle frame and linked by the other of said at least a first end and an opposite second end to an axle support operatively associated with said second axle, said second axle is rigidly disposed in said axle support by screws.

6. A mobile rig as in claim 2 and wherein:
a) said parallel links having at least a first end and an opposite second end, said parallel links linked by one of said at least a first end and an opposite second end to said vehicle frame and linked by the other of said at least a first end and an opposite second end to an axle support operatively associated with said second axle, said second axle is pivoted centrally to said axle support and also about the longitudinal axis of said mobile rig.

7. A mobile rig as in claim 1 and further including:
a) an axle support, said axle support is fixed to said vehicle frame and provides pivotal support of said first axle to permit oscillation thereof about a longitudinal axis of said first axle.

8. A mobile rig as in claim 7 and further including:
a) journal pins, said journal pins adapted to interconnect said axle support to said first axle.

9. A mobile rig as in claim 7 and further including:
a ) an actuator operably associated with each of said axle support and said first axle to permit said first axle to be centrally pivoted along a longitudinal axis thereof and about said axle support.

10. A mobile rig as in claim 9 and wherein:
a) said actuator is a hydraulic cylinder.

11. A mobile rig comprising:
a ) a rigid vehicle frame having a longitudinal axis;
b) a telescoping stacker operably mounted to said frame;
c) a first axle mounted on said vehicle frame, said first axle supporting a first pair of wheels; and
d) a second axle mounted on said vehicle frame a distance from said first axle, said second axle supporting a second pair of wheels, said second axle selectively movable laterally and longitudinally relative to said vehicle frame to provide said second axle with circular translation whereby the distance between said first and second axles is selectively variable upon parallel displacement of said second axle relative to said first axle.

12. A mobile rig as in claim 11 and further including:
a) parallel links, said parallel links operatively associated with said second axle and said vehicle frame for mounting said second axle to said vehicle frame.

13. A mobile rig as in claim 12 and further including:
a) a swivel actuator, said swivel actuator operatively associated with said parallel links for providing swiveling therethrough about a vertical axis.

14. A mobile rig as in claim 12 and wherein:
a) said parallel links having at least a first end and an opposite second end, said parallel links linked by one of said at least first end and an opposite second end to said vehicle frame and linked by the other of said at least a first end and an opposite second end to an axle support operatively associated with said second axle, said second axle is rigidly disposed in said axle support by screws.

15. A mobile rig as in claim 12 and wherein:
a) said parallel links having at least a first end and an opposite second end, said parallel links linked by one of said at least a first end and an opposite second end to said vehicle frame and linked by the other of said at least a first end and an opposite second end to an axle support operatively associated with said second axle, said second axle is pivoted centrally to said axle support and also about the longitudinal axis of said mobile rig.

16. A mobile rig as in claim 11 and further including:
a) an axle support, said axle support is fixed to said vehicle frame and provides pivotal support of said first axle to permit oscillation thereof about a longitudinal axis of said first axle.

17. A mobile rig as in claim 16 and further including:
a) journal pins, said journal pins adapted to interconnect said axle support to said first axle.

18. A mobile rig as in claim 16 and further including:
a) an actuator operably associated with each of said axle support and said first axle to permit said first axle to be centrally pivoted along a longitudinal axis thereof and about said axle support.

19. A mobile rig as in claim 8 and wherein:
a) said actuator is a hydraulic cylinder.

20. A mobile rig comprising:
a) a rigid vehicle frame having a longitudinal axis;
b) a telescoping stacker operably mounted to said frame;
c) a first axle mounted on said vehicle frame, said first axle supporting a first pair of wheels; and
d) a second axle mounted on said vehicle frame a distance from said first axle, said second axle supporting a second pair of wheels and selectively movable both laterally and longitudinally relative to said vehicle frame so that the distance between said first and second axle is adjustable while said first and second axles are maintained in parallel alignment.

* * * * *